United States Patent
Guo (10) Patent No.: US 10,304,355 B2
(45) Date of Patent: May 28, 2019

(54) METHOD AND GUIDE CANE FOR GUIDING THE BLIND

(71) Applicant: Alibaba Group Holding Limited, George Town (KY)

(72) Inventor: Wei Guo, Hangzhou (CN)

(73) Assignee: Alibaba Group Holding Limited (KY)

( * ) Notice: Subject to any disclaimer, the term of this patent is extended or adjusted under 35 U.S.C. 154(b) by 259 days.

(21) Appl. No.: 14/737,145

(22) Filed: Jun. 11, 2015

(65) Prior Publication Data
US 2016/0005334 A1    Jan. 7, 2016

(30) Foreign Application Priority Data
Jun. 13, 2014   (CN) .......................... 2014 1 0263937

(51) Int. Cl.
*A61H 3/06* (2006.01)
*G09B 21/00* (2006.01)
*H04N 5/225* (2006.01)

(52) U.S. Cl.
CPC ......... *G09B 21/006* (2013.01); *H04N 5/2252* (2013.01)

(58) Field of Classification Search
CPC ........ A61H 3/06–3/068; G09B 21/006; H04N 5/2252
See application file for complete search history.

(56) References Cited

U.S. PATENT DOCUMENTS

| | | | |
|---|---|---|---|
| 2,379,426 A | 7/1945 | Edstrom | |
| 4,559,962 A | 12/1985 | Marchiano | |
| 5,936,528 A * | 8/1999 | Kobayashi | A61H 3/061 340/10.34 |
| 9,062,986 B1 * | 6/2015 | Ellis | G01C 21/36 |
| 2006/0028544 A1 | 2/2006 | Tseng | |
| 2006/0108426 A1 | 5/2006 | Hopkins et al. | |
| 2006/0289624 A1 * | 12/2006 | Olmos | A61F 9/08 235/375 |
| 2009/0028003 A1 * | 1/2009 | Behm | A61H 3/061 367/116 |

(Continued)

FOREIGN PATENT DOCUMENTS

| | | |
|---|---|---|
| JP | 09313523 A * | 12/1997 |
| WO | 2004044330 | 5/2004 |
| WO | 2013013127 | 1/2013 |

OTHER PUBLICATIONS

Machine translation of YASUE (JP 09313523 A).*

*Primary Examiner* — Christopher G Findley
(74) *Attorney, Agent, or Firm* — Van Pelt, Yi & James LLP (57) ABSTRACT

Guiding the blind includes receiving, via a camera module, a signal sent from a processing module to instruct the camera module to take an image of an informational blind pathway including a digital object identifier, capturing, via the camera module, the image of the informational blind pathway, sending, via the camera module, the image to the processing module, receiving and analyzing, via the processing module, the image sent by the camera module, acquiring, via the processing module, information included in the digital object identifier in the image of the informational blind pathway, converting, via the processing module, the information included in the digital object identifier into speech information, and outputting the speech information to be played on an audio device.

19 Claims, 7 Drawing Sheets

(56) References Cited

U.S. PATENT DOCUMENTS

| | | | |
|---|---|---|---|
| 2009/0032590 A1* | 2/2009 | Hopkins | A61H 3/061 235/385 |
| 2011/0092249 A1* | 4/2011 | Evanitsky | H04M 1/72594 455/556.1 |
| 2013/0093852 A1* | 4/2013 | Ye | A61H 3/061 348/46 |
| 2013/0200992 A1* | 8/2013 | Kim | A61H 3/061 340/4.11 |

* cited by examiner

METHOD AND GUIDE CANE FOR GUIDING THE BLIND

CROSS REFERENCE TO OTHER APPLICATIONS

This application claims priority to People's Republic of China Patent Application No. 201410263937.8 entitled A METHOD AND A SYSTEM FOR GUIDING THE BLIND, filed Jun. 13, 2014 which is incorporated herein by reference for all purposes.

FIELD OF THE INVENTION

The present application relates to a method and guide cane for guiding the blind.

BACKGROUND OF THE INVENTION

Typically, the majority of information that people obtain comes through their vision. The blind have lost their vision, and this loss creates many difficulties for the blind in work, life, and study. Walking outside presents a difficulty for the blind. So, when a blind person walks alone, the blind person uses a guiding device to aid in his or her walking.

Conventional techniques for guiding the blind include paving a blind pathway especially for the use of blind pedestrians. One type of blind pathway includes strip-like guiding tiles that guide the blind so that the blind can walk without anxiety. This blind pathway is called a forward march blind pathway. Another type of blind pathway includes warning tiles which have dots. These warning tiles warn the blind that there is an obstacle in front of them and they should turn. This type of blind pathway is called a warning blind pathway. A blind person identifies the shape of a blind pathway with his or her cane and advances. A typical guide cane used by a blind person is a cylindrical long cane. The blind person holds one end of the guide cane, and the other end of the guide cane touches the ground ahead. The blind person senses the contact between the guide cane and the ground ahead to determine forthcoming pathway conditions.

Conventional techniques have the following limitations: the blind pathway in existing techniques for guiding the blind can only alert the blind that ahead of them it is possible to walk forward or to turn. However, the existing techniques are not capable of providing the blind with more information about the surrounding area. For example, in a bustling area, the blind cannot obtain information about surrounding buildings. Also, in an area where few people exist and are spread out, the blind cannot easily get help when needed. Accordingly, the existing techniques for guiding the blind fail to allow the blind to walk outdoors conveniently.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
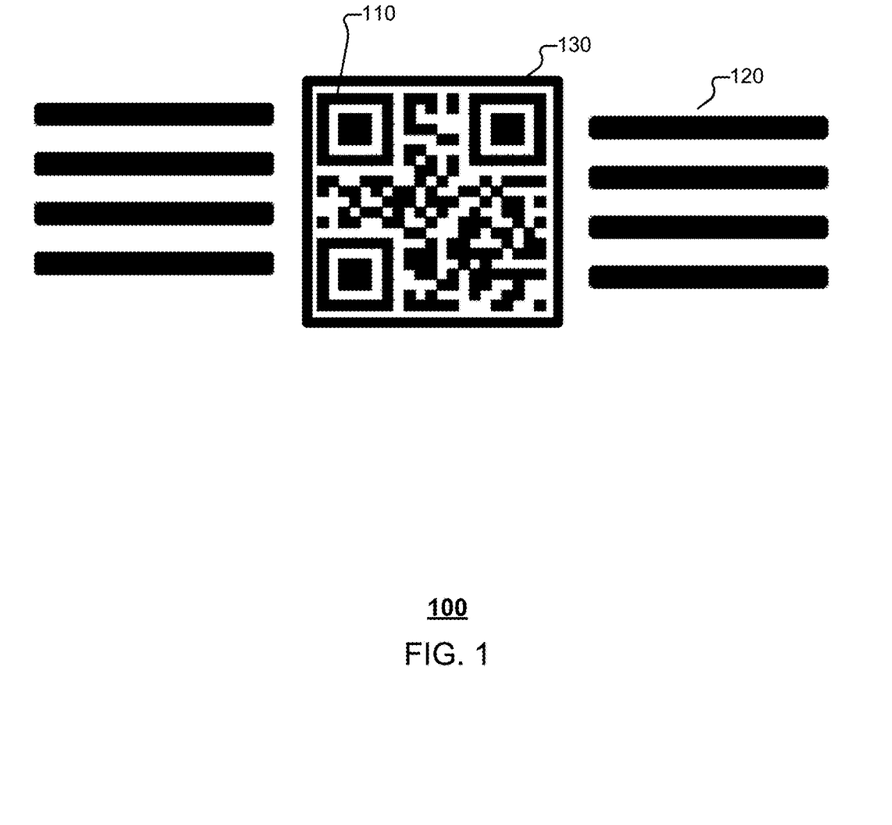
FIG. 1 is a component structure diagram of an embodiment of a blind pathway.

FIG. 1 is a component structure diagram of an embodiment of a blind pathway. In some embodiments, the informational blind pathway 100 comprises informational tiles 110.

In some embodiments, the informational blind pathway 100 further includes ordinary blind pathway tiles 120, and the informational tiles 110 are embedded within the blind pathway 100 including the ordinary blind pathway tiles 120.

In some embodiments, the ordinary blind pathway tiles 120 include raised strips, raised dots, or a combination thereof.

In some embodiments, the informational tiles 110 are constructed to include digital object identifiers (DOI). The digital object identifiers can be used to mark digital information. The digital object identifiers can include: two-dimensional codes, barcodes, or character codes. The digital object identifiers can be used to provide information that helps the blind walk outdoors. For example, the digital object identifiers include information on the area surrounding the current blind pathway position, contact methods for obtaining help, warnings relating to the path condition ahead, or any combination thereof. Encoding the information into the digital object identifiers is understood by one of ordinary skill and will not be further described for conciseness. Examples of the information on the area include: a hospital is 100 meters ahead, a school is 200 meters to the left, a telephone number to call to obtain assistance, and other such information.

In some embodiments, the informational tiles 110 are flat informational tiles, e.g., flat tiles, and the digital object identifiers are constructed on to the tiles using conventional manufacturing techniques such as printing the digital object identifier images on ceramic tiles and heating the tiles at high temperatures to make the images permanent.

In some embodiments, the informational tiles 110 are three-dimensional informational tiles. For example, bumps or depressions on the informational tiles 110 correspond to at least one of the digital object identifiers, and can be constructed using conventional manufacturing techniques such as stamping, molding, or other techniques. In some embodiments, the digital object identifiers correspond to two-dimensional codes. For example, either the black parts or the white parts of a two-dimensional code pattern correspond to bumps on the informational tiles 110. In another example, the edges of either the black parts or the white parts of the two-dimensional code pattern correspond to bumps on the informational tiles 110.

The use of the three-dimensional informational tiles can further help the blind identify these tiles as informational tiles 110. In addition, when the three-dimensional informational tiles are covered with dirt, for example, if dust accumulates on the pathway surface, the patterns of the digital object identifiers can still be identified by detecting the bumps or depressions since these shapes are not easily covered by the dirt.

In some embodiments, the informational tiles 110 are rectangular or square shaped. In some embodiments, the informational tiles are in other shapes.

In some embodiments, edges 130 (which can be raised edges or lowered edges) surround the informational tiles 110 to ensure that blind people can identify these tiles as informational tiles including the digital object identifiers.

The informational tiles can be set at intervals in the informational blind pathway 100 of one informational tile per a preset first distance, or the informational tiles can be set in the informational blind pathway 100 based on actual need. In some embodiments, the first distance interval can be set as needed for the actual environment. For example, informational tiles can be placed in one meter intervals along a pathway.

Figure 2:
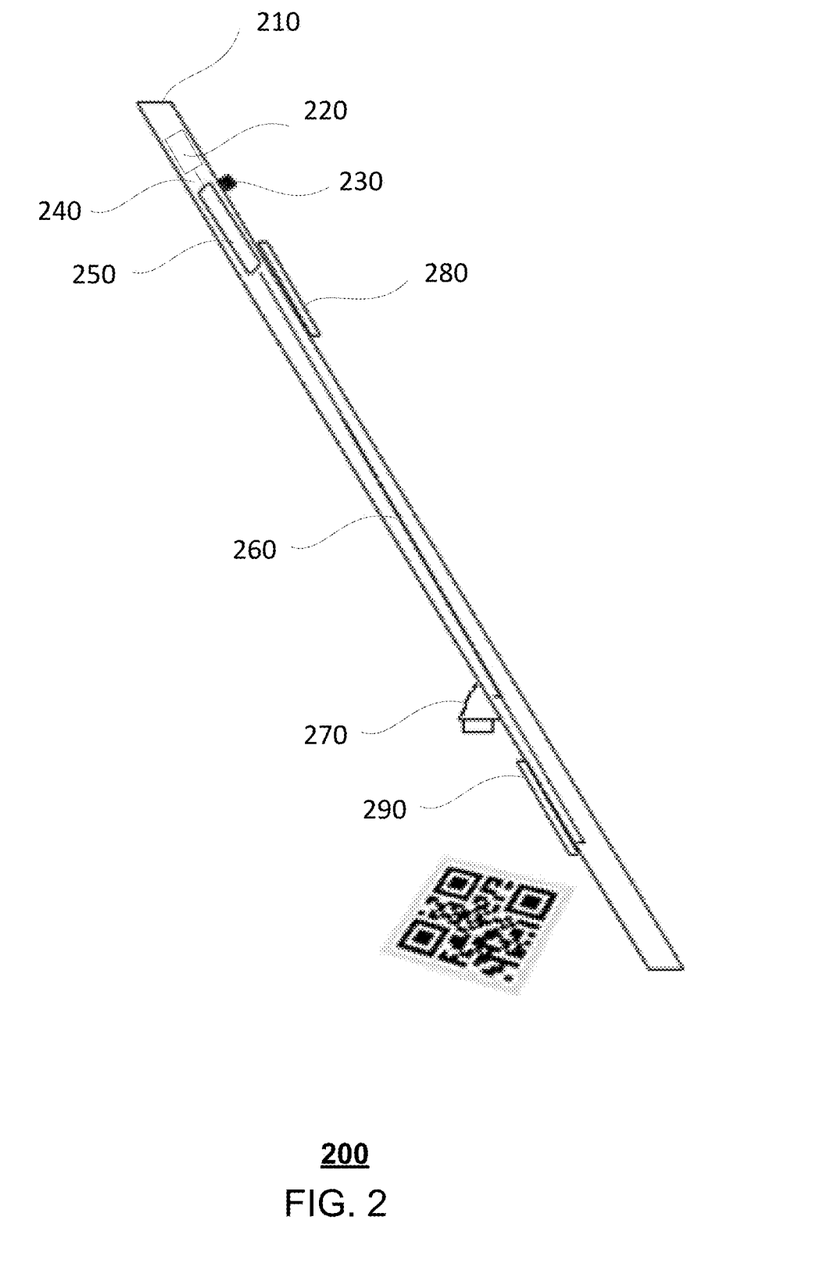
FIG. 2 is a component structure diagram of an embodiment of a guide cane for recognizing digital object identifiers.

FIG. 2 is a component structure diagram of an embodiment of a guide cane for recognizing digital object identifiers. In some embodiments, the guide cane 200 includes a long cylindrical casing 210, a power source 220 (e.g., a battery or other appropriate power storage element), a power source switch 230 (e.g., a double-pole, double-throw switch, or other appropriate switches), a set of power cables 240, a processing module 250 (e.g., a computer processor), a set of data cables 260, a camera module 270 (e.g., a digital camera), and a loudspeaker 280.

In some embodiments, the long cylindrical casing 210 is hollow to allow the set of data cables 260 and the processing module 250 to be stored within the long cylindrical casing.

In some embodiments, the power source switch 230 is disposed on an outer wall of the long cylindrical casing 210. The power source switch 230 can be located on the middle-upper part of the long cylindrical casing 210. The power source switch 230 can be a multi-position switch and can switch on the camera module 270. A first end of the power source switch 230 can be connected to the power source 220 through the power cable 240. A second end of the power source switch 230 can be connected to the processing module 250, the camera module 270, the loudspeaker 280, or any combination thereof via the power cable 240.

In some embodiments, the processing module 250 is disposed in the hollow part of the long cylindrical casing 210. The processing module 250 can be located anywhere in the hollow part of the long cylindrical casing 210. The power source switch 230 is connected to the processing module 250 via the power cable 240.

Figure 3:
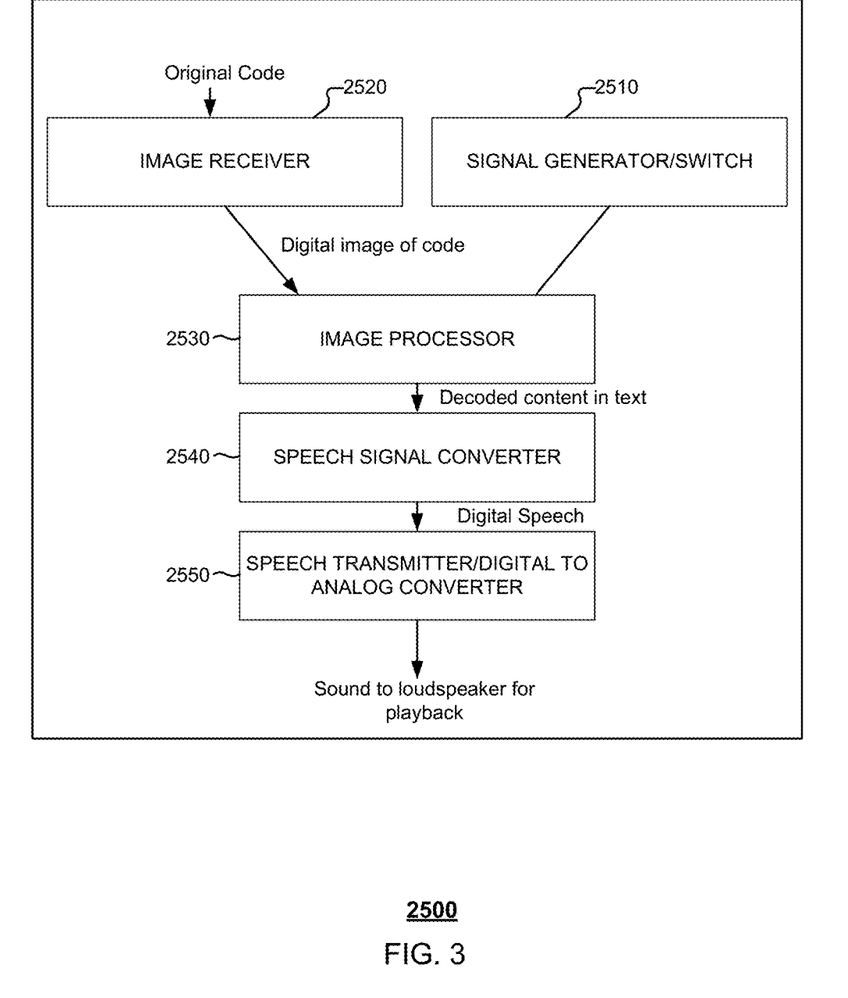
FIG. 3 is a component structure diagram of an embodiment of a processing module.

FIG. 3 is a component structure diagram of an embodiment of a processing module. In some embodiments, the processing module 2500 is an implementation of the processing module 250 of FIG. 2 and comprises: a signal generator or switch 2510, an image receiver 2520, an image processor 2530, a speech signal converter 2540, and a speech transmitter or digital to analog converter 2550.

In some embodiments, in response to the user setting the switch to a specific position and turning on processing module 2500, signal generator or switch 2510 receives a scanned QR code, and sends signals to the camera module 270 of FIG. 2 in order to activate and instruct the camera module 270 to take images.

In some embodiments, the image receiver 2520 receives images sent by the camera module 270 of FIG. 2 and outputs the digital image.

In some embodiments, the image processor 2530 processes the images received by the image receiver 2520, outputs information, and analyzes the outputted information included in digital object identifiers of the informational tiles in the images.

In some embodiments, the speech signal converter 2540 receives the information and converts the information included in the digital object identifiers and analyzed by the image processor 2530 into speech information. Converting the information to speech information (e.g., text to speech (TTS)) is understood by one of ordinary skill and will not be further described for conciseness.

In some embodiments, the speech transmitter or digital to analog converter 2550 sends the speech information generated by the speech signal converter 2540 to the loudspeaker 280 of FIG. 2.

Referring back to FIG. 2, the camera module 270 and the processing module 250 can be connected to each other by the data cable 260. The camera module 270 can be located on the middle-lower part of the long cylindrical casing 210.

Figure 4:
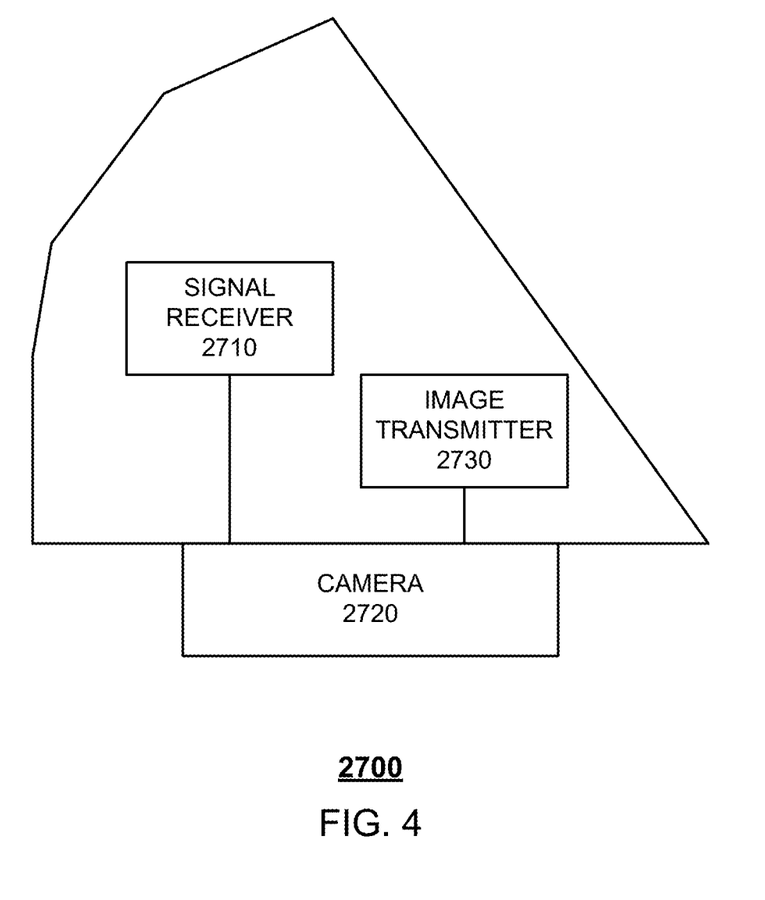
FIG. 4 is a component structure diagram of an embodiment of a camera module.

FIG. 4 is a component structure diagram of an embodiment of a camera module. In some embodiments, the camera module 2700 is an implementation of the camera module 270 of FIG. 2 and comprises: a signal receiver 2710, a camera 2720, and an image transmitter 2730.

In some embodiments, the camera 2720 is located on an outer wall of the long cylindrical casing 210 of FIG. 2. The camera 2720 can face the ground to capture images including the blind pathway tiles. The camera 2720 and the signal receiver 2710 can be connected by the data cable 260 of FIG. 2.

In some embodiments, the signal receiver 2710 receives signals sent by the processing module 250 of FIG. 2. In the event that the signal receiver 2710 receives the signals sent by the processing module 250 of FIG. 2, the camera 2720 takes images.

In some embodiments, the image transmitter 2730 sends the images taken by the camera 2720 to the processing module 250 of FIG. 2. The camera 2720 and the image transmitter 2730 can be connected by the data cable 260 of FIG. 2.

Referring back to FIG. 2, a speaker output of loudspeaker 280 can be located anywhere on the outer wall of the long cylindrical casing 210. The loudspeaker 280 and the processing module 250 are connected by the data cable 260. The loudspeaker 280 receives the speech signals sent by the speech transmitter or digital to analog converter 2550 of FIG. 3 and outputs the received speech signals.

Furthermore, in some embodiments, the guide cane 200 further comprises an illumination module 290.

In some embodiments, the illumination module 290 includes: an illumination lamp (not shown) and an illumination switch (not shown). Each of the two ends of the illumination switch can be connected by a power cable to the power source 220 of FIG. 2 and the illumination lamp, respectively. The illumination switch can be located on the outer wall of the guide cane 200, and the illumination switch can be located on a middle-upper part of the guide cane. The illumination lamp can be located on the outer wall of the guide cane, and light from the illumination lamp can be oriented towards the ground and in the same direction as the camera 2720 of FIG. 4 in order to illuminate the blind pathway tiles of the informational blind pathway on the ground. The illumination can ensure the capture of sharp images even at night.

The above system for guiding the blind includes an informational blind pathway and a guide cane that recognizes digital object identifiers. Informational tiles of the informational blind pathway include digital object identifiers. The information related to the digital object identifiers can include information on the area surrounding the current position and information on how to seek help. The guide cane recognizes the digital object identifiers of the informational blind pathways. The guide cane takes images of the informational blind pathways including the digital object identifiers. By analyzing the images including the digital object identifiers, the guide cane captures information from the digital object identifiers. Moreover, the guide cane outputs the information of the digital object identifiers in the form of speech for a blind person. The blind person can obtain information on the area surrounding the informational blind pathways and information on how to seek help. Therefore, the above system for guiding the blind can facilitate outdoor walks by the blind. Furthermore, in the event that the guide cane of the system includes an illumination module, the illumination module can ensure that sharp images are taken of the informational blind pathway at night. The illumination module ensures that a blind person can walk conveniently outdoors at night.

Figure 5:
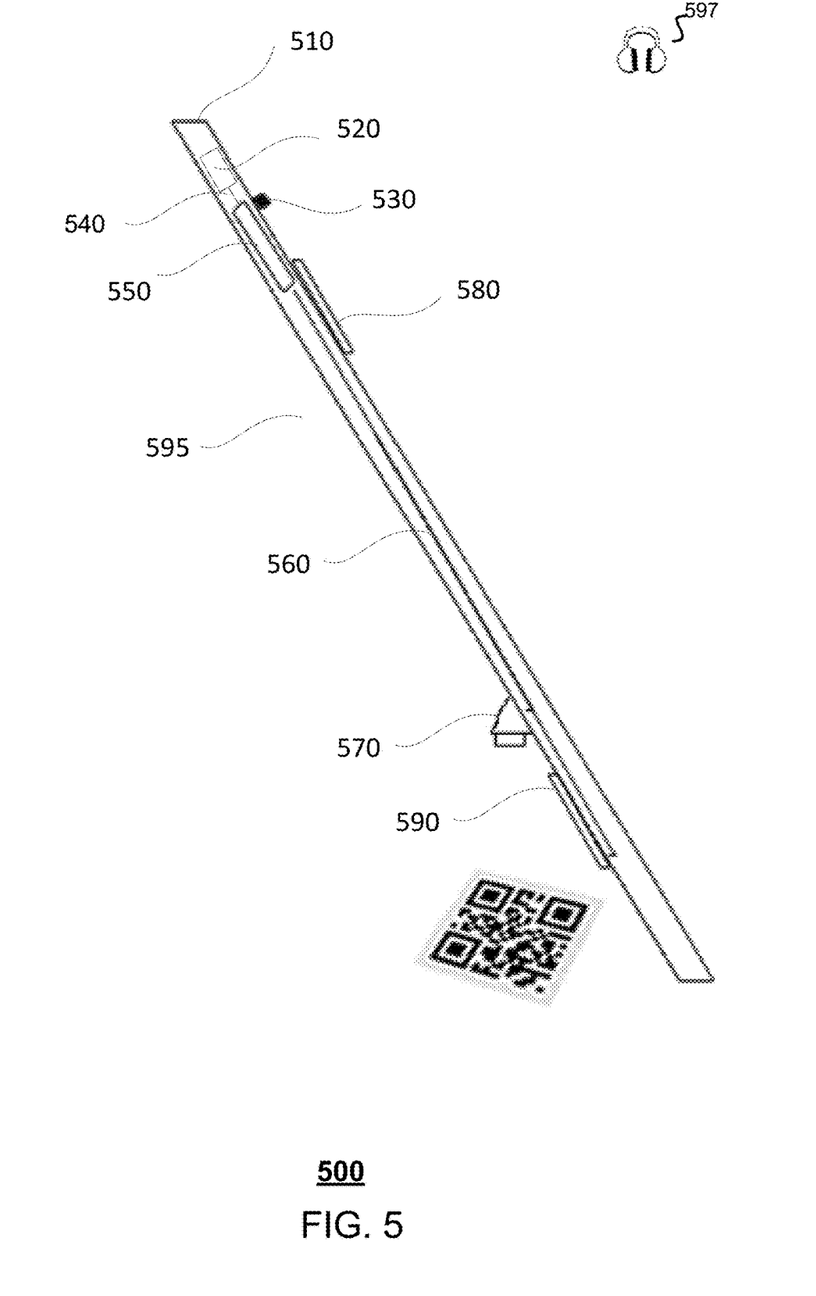
FIG. 5 is a component structure diagram of another embodiment of a guide cane for recognizing digital object identifiers.

FIG. 5 is a component structure diagram of another embodiment of a guide cane for recognizing digital object identifiers. In some embodiments, the guide cane 500 includes a long cylindrical casing 510, a power source 520, a power source switch 530, a power cable 540, a processing module 550, a data cable 560, a camera module 570, a loudspeaker 580, and an illumination module 590.

In some embodiments, the long cylindrical casing 510, the power source 520, the power source switch 530, the power cable 540, the processing module 550, the data cable 560, the camera module 570, the loudspeaker 580, and the illumination module 590 correspond to the long cylindrical casing 210, the power source 220, the power source switch 230, the power cable 240, the processing module 250, the data cable 260, the camera module 270, the loudspeaker 280, and the illumination module 290 of FIG. 2, respectively. The guide cane 500 further includes a Bluetooth signal sending module 595 (e.g., a Bluetooth transmitter) and a Bluetooth headset 597.

In some embodiments, the Bluetooth signal sending module 595 is connected to a speech transmitter of the processing module 550 through the data cable 560. The Bluetooth signal sending module 595 can be disposed anywhere in the hollow part of the casing 510. The Bluetooth headset 597 can be separate from the casing 510. The Bluetooth headset 597 can match the Bluetooth signal sending module 595. The Bluetooth headset 597 can receive and output speech information sent by the Bluetooth signal sending module 595.

An embodiment of the system for guiding the blind including the guide cane 500 of FIG. 5 can provide the technical results of an embodiment of the system for guiding the blind of the present application.

Figure 6:
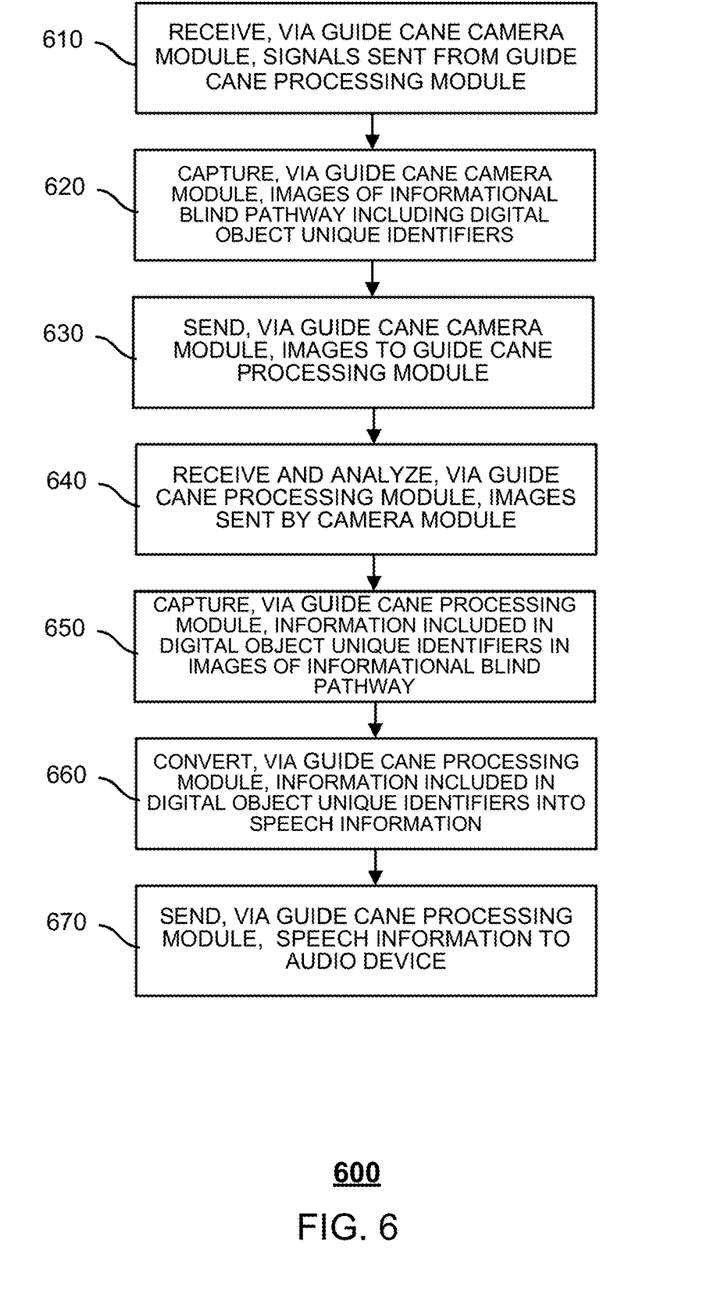
FIG. 6 is a flowchart of an embodiment of a process for guiding the blind.

FIG. 6 is a flowchart of an embodiment of a process for guiding the blind. In some embodiments, the process 600 is implemented by a guide cane 710 of FIG. 7 and comprises:

In 610, the guide cane receives, via a guide cane camera module, signals sent from a guide cane processing module. For example, a signal generator of the guide cane processing module sends the signals to the guide cane camera module in order to activate and instruct the guide cane camera module to take images.

In 620, the guide cane captures, via the guide cane camera module, images of an informational blind pathway including digital object identifiers.

In 630, the guide cane sends, via the guide cane camera module, the images to the guide cane processing module.

In some embodiments, the guide cane power source switch turns on power to a processing module, camera module, loudspeaker, Bluetooth signal sending module, or any combination thereof of the guide cane.

In some embodiments, a signal generator in the processing module of the guide cane sends signals to activate the camera module. The signal generator can send signals at a predetermined frequency. For example, predetermined frequencies includes 5 per second, 10 per second, etc. For example, after a quick response (QR) code is scanned, if the image processor fails to decode the QR code, then the signal generator activates the camera module again to take another image to be processed. When the frequency is 5 per second, the camera module is taking images every 200 ms.

The camera module of the guide cane can receive the signals sent by the processing module of the guide cane. After receiving the signals sent from the processing module, a camera in the camera module can be activated to take photographs or images of an informational blind pathway. The informational blind pathway can be a blind pathway including informational tiles. The images that are taken can correspondingly include digital object identifiers of the informational tiles. The digital object identifiers can include: two-dimensional codes, barcodes, or character codes (e.g., a text string). The digital object identifiers can be used to provide information that helps blind people walk outdoors. For example, the information that helps blind people walk outdoors can include information on an area surrounding the current blind pathway position, contact information for obtaining help, warnings relating to path conditions ahead, or any combination thereof. Warnings relating to path conditions ahead include construction ahead, detour, etc. Examples of the information on the area surrounding the current blind pathway position include: a hospital is 100 meters ahead, a school is 200 meters to the left, a busy intersection is 10 meters ahead, and other such information.

Examples of the contact information for obtaining help can include a telephone number for obtaining assistance, and other such information.

An image transmitter in the camera module can send the images that were taken to an image receiver of the processing module.

In 640, the guide cane receives and analyzes, via the guide cane processing module, images sent by the camera module.

In 650, the guide cane captures, via the guide cane processing module, information included in digital object identifiers in the images of the informational blind pathway.

In some embodiments, the image receiver in the guide cane processing module can receive taken images sent by the image transmitter in the camera module. The image processor in the processing module can process the images received by the image receiver and analyze the information included in the digital object identifiers in the images.

In 660, the guide cane converts, via the guide cane processing module, the information included in the digital object identifiers into speech information.

In 670, the guide cane sends, via the guide cane processing module, the speech information to an audio device.

In some embodiments, the audio device includes a loudspeaker or a Bluetooth information sending module.

In some embodiments, a speech signal converter in the guide cane processing module converts the information included in the digital object identifiers and analyzed by the image processor into speech information. The speech sending module of the processing module can send the speech signals to the loudspeaker or the Bluetooth information sending module.

The loudspeaker outputs the speech information, or the Bluetooth information sending module sends the speech information to a matched Bluetooth headset, and the Bluetooth headset outputs the speech information.

The above process 600 uses a guide cane that recognizes digital object identifiers to take images of an informational blind pathway including informational tiles. The digital object identifiers on the informational tiles include information on the area surrounding the current position, information on how to seek help, warnings relating to path conditions ahead, or any combination thereof. By analyzing the images included in the digital object identifiers, a processing module can capture information included in the digital object identifiers and convert the information included in the digital object identifiers to speech information, which the processing module sends to the loudspeaker or the Bluetooth information sending module to be sent to a matched Bluetooth headset. From the speech information output by the loudspeaker or the Bluetooth headset, the blind person can obtain information about the surrounding area, information on how to seek help, warnings relating to path conditions ahead, or any combination thereof, thus ensuring that the blind person can walk outdoors conveniently.

Figure 7:
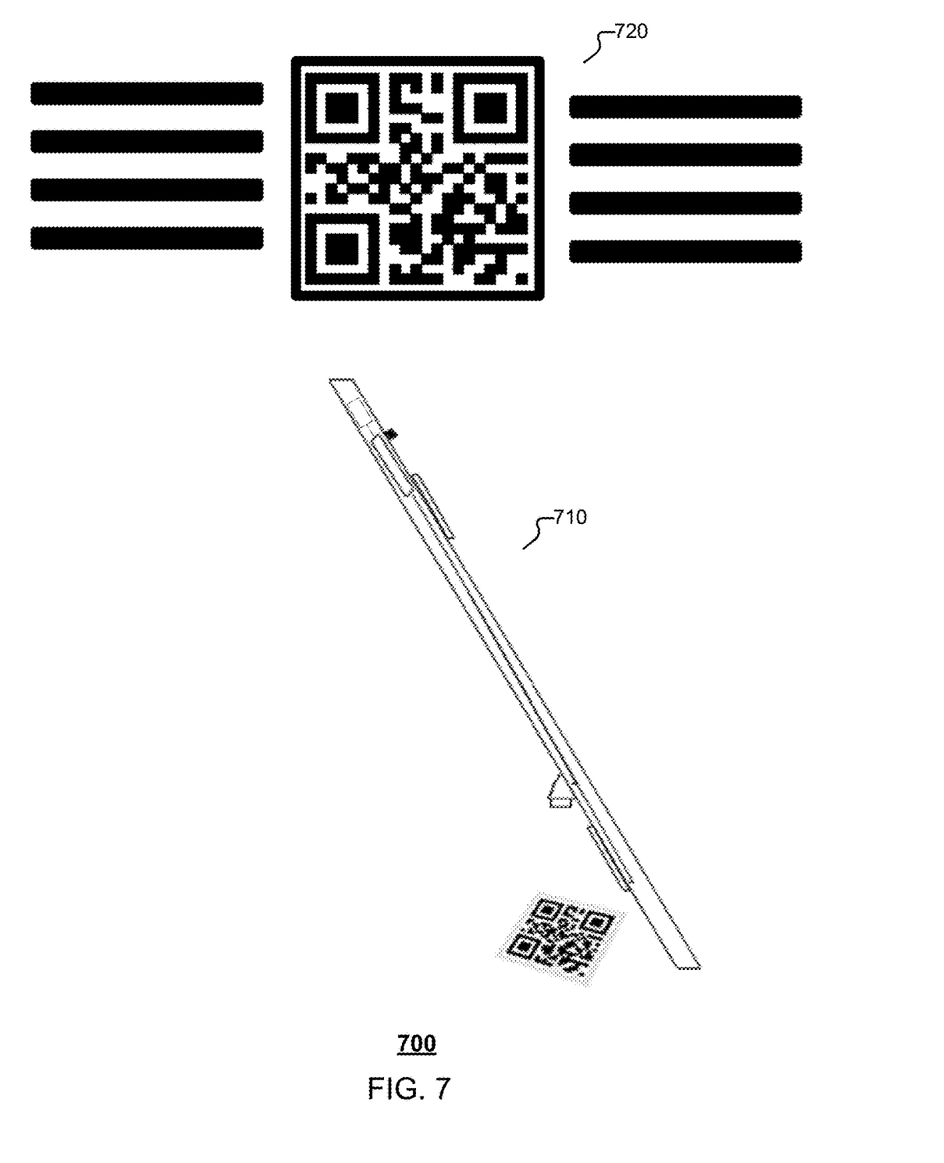
FIG. 7 is a diagram of an embodiment of a system for guiding the blind.

FIG. 7 is a diagram of an embodiment of a system for guiding the blind. In some embodiments, the system 700 includes a guide cane 710 and an informational blind pathway 720.

The guide cane 710 receives, via a camera module, a signal sent from a processing module to instruct the camera module to take an image of an informational blind pathway 720 including an informational tile, the informational tile including a digital object identifier, captures, via the camera module, the image of the informational blind pathway, sends, via the camera module, the image to the processing module, receives and analyzes, via the processing module, the image sent by the camera module, acquires, via the processing module, information included in the digital object identifier in the image of the informational blind pathway, converts, via the processing module, the information included in the digital object identifier into speech information, and outputs the speech information to be played on an audio device.

The modules described above can be implemented as software components executing on one or more general purpose processors, as hardware such as programmable logic devices and/or Application Specific Integrated Circuits designed to perform certain functions or a combination thereof. The camera module may require additional hardware and/or software, which would be understood by one of ordinary skill in the art. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method, comprising:
receiving, via a camera module, a signal sent from a processing module to instruct the camera module to take an image of an informational blind pathway comprising a first digital object identifier included in a first informational tile;
capturing, via the camera module, the image of the informational blind pathway;
sending, via the camera module, the image to the processing module;
receiving and analyzing, via the processing module, the image sent by the camera module;
acquiring, via the processing module, information included in the first digital object identifier in the image of the informational blind pathway, wherein the informational blind pathway comprises a plurality of informational tiles, wherein the informational blind pathway further comprises tactile features providing guidance between the first informational tile and a second informational tile comprising a second digital object identifier, and wherein the plurality of informational tiles are positioned at prespecified locations within the informational blind pathway;
converting, via the processing module, the information included in the digital object identifier into speech information; and outputting the speech information to be played on an audio device.

2. The method as described in claim 1, wherein a Bluetooth information sending module sends the speech information to a Bluetooth headset matched with the Bluetooth information sending module.

3. The method as described in claim 1, wherein the digital object identifier includes a two-dimensional code, a barcode, a character code, or any combination thereof.

4. The method as described in claim 1, wherein the informational tile is surrounded by raised or lowered edges to allow a visually impaired person to identify the digital object identifier.

5. The method as described in claim 1, wherein the tactile features include raised edges or raised dots.

6. The method of claim 1 wherein the processing module is configured to instruct the camera module to take the image of the informational blind pathway by using a signal generator configured to send signals to the camera module at a predetermined frequency.

7. A guide cane, comprising:
a casing;
a power source;
a power source switch;
a plurality of power cables;
a processing module;
a data cable;
a camera module that captures a first digital object identifier included in a first informational tile of an informational blind pathway, the informational blind pathway comprising a plurality of informational tiles, wherein the informational blind pathway further comprises tactile features providing guidance between the first informational tile and a second informational tile comprising a second digital object identifier, and wherein the plurality of informational tiles are positioned at prespecified locations within the informational blind pathway; and
a loudspeaker, wherein:
the power source switch is disposed at least in part on an outer wall of the casing;
a first end of the power source switch is connected to the power source through a power cable among the plurality of power cables;
a second end of the power source switch is connected to the processing module, the camera module, the loudspeaker, or any combination thereof through at least some of the plurality of power cables;
the camera module is connected to the processing module through the data cable;
a speaker output of the loudspeaker is located on the outer wall of the casing; and
the loudspeaker is connected to the processing module through the data cable.

8. The guide cane as described in claim 7, wherein the digital object identifier includes a two-dimensional code, a barcode, a character code, or any combination thereof.

9. The guide cane as described in claim 7, wherein the informational tile further includes a flat informational tile or a three-dimensional informational tile.

10. The guide cane as described in claim 9, wherein the informational tile includes the three-dimensional informational tile including a bump or a depression to correspond with the digital object identifier.

11. The guide cane as described in claim 7, wherein information included in the digital object identifier comprises: information on an area surrounding a current blind pathway position, contact information to obtain help, a warning relating to a path ahead, or any combination thereof.

12. The guide cane as described in claim 7, wherein raised or lowered edges surround the informational tile.

13. The guide cane as described in claim 7, wherein the informational blind pathway further comprises: an ordinary blind pathway tile, and the informational tile being interspersed within the informational blind pathway including the ordinary blind pathway tile.

14. The guide cane as described in claim 7, wherein:
the processing module comprises a signal generator, an image receiver, an image processor, a speech signal converter, and a speech transmitter;
the signal generator is configured to send signals to the camera module to instruct the camera module to take an image of the informational blind pathway including the digital object identifier;
the image receiver is configured to receive the image of the informational tile including the digital object identifier sent by the camera module;
the image processor is configured to process the image received by the image receiver and analyze information included in the digital object identifier of the image;
the speech signal converter is configured to convert the information included in the digital object identifier and analyzed by the image processor into speech information; and
the speech transmitter is configured to output the speech information to be played on the loudspeaker.

15. The guide cane as described in claim 7, wherein:
the camera module comprises a signal receiver, a camera, and an image transmitter;
the camera is located on the outer wall of the casing, the camera facing the ground to capture an image of the informational blind pathway;
the signal receiver is configured to receive signals sent by the processing module;
after the signal receiver receives the signals sent by the processing module, the camera takes the image; and
the image transmitter is configured to send the image taken by the camera to the processing module.

16. The guide cane as described in claim 7, further comprising:
a Bluetooth signal sending module; and
a Bluetooth headset matched with the Bluetooth signal sending module.

17. The guide cane as described in claim 7 further comprising:
an illumination device comprising an illumination lamp and an illumination switch.

18. The guide cane as described in claim 17, wherein the illumination device is located on the outer wall of the casing, a illumination direction of the illumination device being the same as a direction of the camera.

19. A guide cane, comprising:
a casing;
a power source;
a power source switch;
a plurality of power cables;
a processing module;
a data cable;
a camera module; and
a loudspeaker, wherein:
the power source switch is disposed at least in part on an outer wall of the casing;

a first end of the power source switch is connected to the power source through a power cable among the plurality of power cables;

a second end of the power source switch is connected to the processing module, the camera module, the loudspeaker, or any combination thereof through at least some of the plurality of power cables;

the camera module is connected to the processing module through the data cable, and is configured to capture a first digital object identifier included in a first informational tile of an informational blind pathway, the informational blind pathway comprising a plurality of informational tiles, wherein the informational blind pathway further comprises tactile features providing guidance between the first informational tile and a second informational tile comprising a second digital object identifier, and wherein the plurality of informational tiles are being positioned at prespecified locations within the informational blind pathway;

a speaker output of the loudspeaker is located on the outer wall of the casing; and the loudspeaker is connected to the processing module through the data cable.

* * * * *

UNITED STATES PATENT AND TRADEMARK OFFICE
CERTIFICATE OF CORRECTION

PATENT NO. : 10,304,355 B2
APPLICATION NO. : 14/737145
DATED : May 28, 2019
INVENTOR(S) : Wei Guo

Page 1 of 1

It is certified that error appears in the above-identified patent and that said Letters Patent is hereby corrected as shown below:

In the Claims

Column 11, Claim 19, Line 18, delete "being".

Signed and Sealed this
Twelfth Day of November, 2019

Andrei Iancu
*Director of the United States Patent and Trademark Office*